United States Patent [19]

Terada et al.

[11] Patent Number: 5,262,129
[45] Date of Patent: Nov. 16, 1993

[54] OZONE FILTER AND METHOD OF PRODUCTION THEREOF

[75] Inventors: Isao Terada; Shinichiro Arai; Nobuo Tomita, all of Kanagawa, Japan

[73] Assignee: Nichias Corporation, Tokyo, Japan

[21] Appl. No.: 913,700

[22] Filed: Jul. 16, 1992

[30] Foreign Application Priority Data

Jul. 19, 1991 [JP] Japan ................................. 3-203670

[51] Int. Cl.$^5$ ..................... B01D 39/20; B01J 23/34
[52] U.S. Cl. ..................... 422/122; 422/120; 55/524; 55/527; 55/DIG. 5; 428/116; 423/219; 423/581; 502/324
[58] Field of Search ............... 55/262, 279, 301, 522, 55/524, 527, DIG. 5; 422/120, 122, 177; 428/116, 184; 502/324; 423/219, 581

[56] References Cited

U.S. PATENT DOCUMENTS

| | | | |
|---|---|---|---|
| 4,207,291 | 6/1980 | Byrd et al. | 422/122 |
| 4,280,926 | 7/1981 | Abe et al. | 428/116 X |
| 4,992,319 | 2/1991 | Kurosawa et al. | 55/524 X |
| 5,112,796 | 5/1992 | Iannicelli | 55/524 X |

FOREIGN PATENT DOCUMENTS 0398765  11/1990  European Pat. Off. .
2208207   6/1988  United Kingdom .

*Primary Examiner*—Robert J. Warden
*Assistant Examiner*—E. Leigh Dawson
*Attorney, Agent, or Firm*—Sughrue, Mion, Zinn, Macpeak & Seas

[57] ABSTRACT

An ozone filter for decomposing ozone in the air is disclosed. The ozone filter is composed of a carrier formed by paper made of inorganic fibers having a porosity of 70 to 95%. The carrier is impregnated with a solution of fine powder-like activated manganese dioxide dispersed in water and having a particle size of 0.3 to 50 μm and a specific surface area of not less than 100 m$^2$/g in an amount of not less than 40 g/m$^2$, on a dry white base of activated manganese dioxide, which is allowed to adhere to the carrier, and is then dried. The ozone filter thus produced is more active and has a longer life with a reduced pressure loss than conventional ozone filters.

6 Claims, No Drawings

OZONE FILTER AND METHOD OF PRODUCTION THEREOF

BACKGROUND INVENTION

The present invention is directed to the field of ozone decomposition. In particular, the present invention is directed to an ozone filter having a carrier composed of paper made of inorganic fibers impregnated with a solution of fine powder-like active manganese dioxide, thereby providing a high-performance ozone filter which is suitable for use in preventing emission of ozone.

Due to the powerful oxidizing action of ozone, it is useful in sterilization, disinfection, and other treatment applications. Ozone is also utilized extensively in the field of medical treatment and food preparation. Although ozone has many useful applications, ozone can be very harmful to human life. For example, the toxicity exhibited by ozone causes irritation in the human respiratory system if the toxicity concentration in the air exceeds 0.1 particles per million (ppm), and endangers human life if it exceeds 50 ppm. The amount of ozone in the air has increased in recent years due to the production of ozone by machines such as electrostatic copying machines and the like. It is therefore desirable to develop a simple method of decomposing ozone in the air.

Conventionally, ozone processing technologies include an activated carbon adsorption process, a thermal decomposition process, a wet process, and a contact decomposition process. The contact decomposition process is advantageous in many respects because it is extremely safe, can be carried out at ordinary temperatures, and can be carried out easily on a small scale.

Manganese dioxide is conventionally used as a decomposing catalyst, as shown by, for example, Japanese Patent Application Laid-Open No. 4094/1976, Japanese Patent Application Publication No. 8456/1980, and Japanese Patent Application Laid-Open No. 245850/1989. In addition, a nickel-based catalyst has been used as a decomposing catalyst. The manganese dioxide-based catalysts, however, are more advantageous in terms of cost. In an ozone decomposing reaction, as well as a vapor-phase-contact decomposing reaction, it is desirable to attain a high reaction rate by causing the processed gas and the catalyst to positively contact each other, while minimizing any pressure loss thereby resulting. Thus, it is necessary to use a highly activated catalyst, and carefully monitor the method used to bring the processed gas into contact with the catalyst. Ozone filters used to decompose ozone in the air generated by office machines and the like are restricted in terms of size and level of noise produced. As the ozone concentration in the air is ordinarily very low, it is particularly important that a large volume of air be processed with a small amount of catalyst at a high reaction rate and a reduced pressure loss using such ozone filters. Typically, such ozone filters have a catalyst that is carried by a carrier with a honeycomb structure.

SUMMARY OF THE INVENTION

An object of the present invention is to provide a high-performance ozone filter which can be used in a very high space velocity and whose pressure loss is small. The ozone filter of the present invention is hence suitable for use in preventing the emission of ozone when mounted in an office machine or the like.

The ozone filter in accordance with the present invention is characterized in that fine powder-like manganese dioxide having a particle size of not more than 150 $\mu$m and a specific surface area of not less than 100 m$^2$/g is fixed in an amount of not less than 40 g/m$^2$ in a carrier composed of paper made of inorganic fibers having a high porosity and a residual porosity of 50% or more.

In addition, the present invention is directed to a method of producing an ozone filter characterized in that fine powder-like activated manganese dioxide, having a particle size of 0.3 to 50 $\mu$m and a specific surface area of not less than 150 m$^2$/g, is dispersed in water together with a binder, a carrier composed of paper and made of inorganic fibers and having a porosity of 70 to 95% is impregnated with a resultant solution with activated manganese dioxide dispersed in water, and not less than 40 g/m$^2$, on a dry-weight basis, of activated manganese dioxide is allowed to adhere to the carrier, and then the carrier is dried.

DETAILED DESCRIPTION OF THE INVENTION

As described above, a first feature of the present invention is that fine powder-like activated manganese dioxide having a particle size of no more than 150 $\mu$m, preferably, 0.3 to 50 $\mu$m and a specific surface area of not less than 100 (preferably 150) m$^2$/g, is used as a catalyst. The activated manganese dioxide catalyst itself is well known, as stated above; however, unless the grain size is within the aforementioned range, it is difficult for the catalyst to be carried by a carrier composed of paper made of inorganic fibers in a large volume and uniformly carried up to a core portion of the carrier. In addition, unless the specific surface area is not less than 100 m$^2$/g, an ozone filter having an outstanding ozone decomposing capability cannot be obtained even if other requirements are met. Such a manganese dioxide catalyst having a fine powder-like configuration and a large specific surface is not commonplace. However, such a manganese dioxide catalyst can be obtained easily if preparation is performed carefully by using a method in which, for example, a suspension of manganese carbonate in water is reacted with an aqueous solution of an oxidizing agent such as hypochlorite or permanganate, the resultant precipitate of manganese dioxide is subjected to an oxidation treatment, and is neutralized with an alkali, such as that disclosed in Japanese Patent Application Publication No. 8456/1980, or other similar method. The manganese dioxide catalyst obtained by this method of production becomes porous due to carbon dioxide which is generated in a process for producing manganese dioxide from manganese carbonate and has a large specific surface. Manganese dioxide obtained by heating an aqueous solution of manganese nitrite or manganese sulfate to 300° to 400° C. has a specific surface area of approximately 50 m$^2$/g or less, while catalytic manganese dioxide has a specific surface area of 80 m$^2$/g at best.

A second feature of the present invention lies in that the above-described manganese dioxide catalyst is carried in an amount not less than 40 g/m$^2$ in a carrier composed of paper made of inorganic fibers having a high porosity. Carrying the catalyst at such a high density is impossible in the case of a carrier which carries the catalyst only on its surface, as in the case of an extrusion-molded cordierite-matter carrier. It is possible only by filling the cavities of the fibers with the catalyst by using a carrier composed of paper made of inorganic fibers having a high porosity.

A particularly preferable carrier for carrying the manganese dioxide catalyst is paper composed of inorganic fibers such as alumina fibers, silica alumina fibers, glass fibers, or rock wool and having a high porosity of 70 to 95%, as well as a honeycomb structure obtained by processing that paper, as disclosed in Japanese Patent Application Laid-Open No. 10345/1984. Such a honeycomb structure is commercially available from Nichias Corporation of Japan under the product name of HONEYCLE. The porosity referred to herein is a value which is determined on the basis of the following formula:

Porosity (%) = (1-nominal volume density/true density) × 100

In order to attain a resultant porosity of 50 to 85% in the paper which has carried the fine-powder like active manganese dioxide, it is preferable to use the paper in which pores having a pore diameter of 2 $\mu$m or more occupies 60% or more of the total pore volume, and pores having a pore diameter of 10 $\mu$m or more occupies 40% or more of the total pore volume.

The carrier of a honeycomb structure formed of paper made of inorganic fibers is optimally suited for processing a large volume of air at a low pressure loss, and excels as a carrier for a manganese dioxide catalyst for processing low-density ozone-containing air. In addition, since the carrier is subject to cutting processing, it is possible to easily fabricate a carrier having an arbitrary shape and size, and this carrier is characterized in that it does not break even if it is dropped. A preferable honeycomb structure has an effective surface area of 8 to 40 $cm^2/cm^3$ (more preferably 20 to 40 $cm^2/cm^3$) and an aperture area rate of 50 to 90% (more preferably 50 to 70%).

A third feature of the present invention lies in that when the manganese dioxide catalyst is carried in a large volume by the carrier composed of paper made of high-porosity inorganic fibers, some of the voids between the fibers of the paper are left as voids, and the residual porosity, i.e., the porosity which is calculated by the aforementioned formula for calculating the porosity after the carriage by the carrier, is set to 50 to 85%. Since the carrier is formed of paper having a high porosity, manganese dioxide powder having a particle size of 0.3 to 50 $\mu$m readily enters the gaps between the inorganic fibers constituting the paper, so that it is possible to affect the carriage of the catalyst in such a manner that the voids ultimately disappear. Yet, it would become difficult for the air to be processed to be dispersed to the manganese dioxide particles which have entered the core and have been fixed therein. Since some of the voids are left to allow the air to be processed to flow therethrough, the dispersion of air to the filled catalyst is facilitated, so that the utilization rate of the manganese dioxide catalyst carried at a high density improves.

In producing the ozone filter of the present invention, to cause the carrier formed of inorganic fiber paper of a high porosity to carry the fine powder-like activated manganese dioxide, the carrier is impregnated, by immersion or coating, with an inorganic binder, such as silica sol, alumina sol, or titania sol, or a mixture thereof, an organic binder, such as polyvinyl alcohol, vinylidene chloride, an acrylic emulsion, and the like are added to a suspension of activated manganese dioxide, and then the carrier dried. At this time, it is desirable that the amount of binder used be restricted to a necessary minimum, and if it is used in excess, the binder covers the surface of manganese dioxide, resulting in a decline in the catalytic activity. If it is difficult to fix a necessary amount of catalyst at one time, the catalyst impregnation processing and drying can be repeated until an appropriate amount of catalyst is fixed.

The present invention is further illustrated by, but should not be limited to, the following reference example and control examples.

REFERENCE EXAMPLE 1

Paper having a thickness of 0.2 mm and a porosity of 90% and composed of silica alumina fibers with a fiber diameter of 2 to 3 $\mu$m and a small amount of organic adhesive agent was processed into corrugated paper with a crest height of 1.3 mm and a pitch of 2.8 mm. Unprocessed flat sheets and the corrugated sheets of paper were superposed alternately one on top of another, and contact points were bonded with a silica-based adhesive agent, thereby obtaining a honeycomb-structure carrier having cells in the amount of 380 cells/$in^2$.

Meanwhile, 1 kg of manganese carbonate, obtained by subjecting a precipitate, produced by reacting an aqueous solution of manganese sulfate with an aqueous solution of sodium carbonate, to washing and drying, was suspended in 2000 ml of water. While the solution was being heated to 60° C. and being stirred, an aqueous solution of sodium hypochlorite was added thereto in small degrees. As a result, manganese carbonate reacted while producing carbon dioxide, changing into manganese dioxide of a black color. Upon completion of the reaction, the manganese dioxide precipitate thus produced was filtered, washed, and dried. The resultant manganese dioxide powders had a specific surface area of 220 $m^2/g$ and then was pulverized to have an average particle size of 5 $\mu$m.

100 parts by weight of the aforementioned manganese dioxide powders was mixed with 100 parts by weight of silica sol (solid content: 30 wt %) and 200 parts by weight of water, the aforementioned honeycomb-structure carrier (dimensions: cell aperture plane: 100 mm × 100 mm; length in the air-flow direction: 15 mm) was immersed in a resultant slurry and then dried. Subsequently, by repeating the aforementioned immersion and drying one more time, an ozone filter having a manganese dioxide-carrying amount of 88 $g/m^2$ and a residual porosity of 70% was obtained.

REFERENCE EXAMPLE 2

Paper having a thickness of 0.2 mm and a porosity of 90% and composed of silica alumina fibers with a fiber diameter of 2 to 3 $\mu$m and a small amount of organic adhesive agent was processed into corrugated paper with a crest height of 1.3 mm and a pitch of 2.8 mm. Unprocessed flat sheets and the corrugated sheets of paper were superposed alternately one on top of another, and contact points were bonded with a silica-based adhesive agent, thereby obtaining a honeycomb-structure carrier having cells in the amount of 380 cells/$in^2$.

Meanwhile, 1 kg of manganese carbonate, obtained by subjecting a precipitate, produced by reacting an aqueous solution of manganese sulfate with an aqueous solution of sodium carbonate, to washing and drying, was suspended in 2000 ml of water. While the solution was being heated to 60° C. and being stirred, an aqueous solution of sodium hypochlorite was added thereto in small degrees. As a result, manganese carbonate reacted while producing carbon dioxide, changing into manganese dioxide of a black color. Upon completion of the reaction, the manganese dioxide precipitate thus produced was filtered, washed, and dried. The manganese dioxide was subject to heat treatment at 500° C. for three hours. The resultant manganese dioxide powders had a specific surface area of 110 m$^2$/g and then was pulverized to have an average particle size of 10 μm.

100 parts by weight of the aforementioned manganese dioxide powders was mixed with 100 parts by weight of silica sol (solid content: 30 wt %) and 200 parts by weight of water, the aforementioned honeycomb-structure carrier (dimensions: cell aperture plane: 100 mm×100 mm; length in the air-flow direction: 15 mm) was immersed in a resultant slurry and then dried. Subsequently, by repeating the aforementioned immersion and drying one more time, an ozone filter having a manganese dioxide-carrying amount of 95 g/m$^2$ and a residual porosity of 69% was obtained.

EXAMPLE 1

In the same way was in the Reference Example 1 above, with the exception that commercially available electrolytic manganese dioxide powders having a specific surface of 45 m$^2$/g were used as a catalyst, an ozone filter having a manganese dioxide-carrying amount of 93 g/m$^2$ was produced.

EXAMPLE 2

In the same way as in the Reference Example 1 above, with the exception that a cordierite matter extrusion-molded honeycomb structure (No. of cells: 400 cells/in$^2$) was used as a carrier for manganese dioxide, an ozone filter having a manganese dioxide-carrying amount of 37 g/m$^2$ was produced.

EXAMPLE 3

A honeycomb structure carrier produced in the same way as in the Reference Example 1 above was impregnated with an aqueous solution of manganese nitrate, was dried, and baked at 350° C. As a result of repeating this process twice, an ozone filter having a manganese dioxide-carrying amount of 88 g/m$^2$ was produced.

EXAMPLE 4

In the same way as in the Reference Example 2 above, with the exception that the temperature of the heat treatment for adjusting the specific surface was 650° C., the manganese dioxide powder having a specific surface of 60 m$^2$/g was obtained and was pulverized to have an average particle size of 10 μm. In the same way as in Reference Example 2, the resultant ozone filter having a manganese dioxide-carrying amount of 90 g/m$^2$ and a residual porosity of 70% was obtained.

Next, the ozone decomposing capability was examined by the following method with respect to the ozone filters in the examples above.

Test method: Ozone-containing air, obtained by dehumidifying of air by a silent discharge-type ozone generator, was diluted by clean air, and a gas to be processed having an ozone concentration of 1 ppm and a relative humidity of 40% was prepared. The gas to be processed was allowed to flow continuously through the above-described ozone filter, which was arranged such that the cell aperture plane of the honeycomb structure carrier was orthogonal to the direction of air flow, at a temperature of 40° C. and a velocity of 1.0 m/s. At every hour, and every two hours after the lapse of two hours, the outlet-side air was sampled, and the ozone decomposing rate was measured based on the following formula:

Ozone decomposing rate (%) =

(inlet ozone concentration − outlet ozone concentration) × 100/inlet ozone concentration The measured results are shown in Table 1.

TABLE 1

| | Ozone Decomposing Rate (%) | | | | | |
|---|---|---|---|---|---|---|
| Elapsed Time | Reference Example 1 | Reference Example 2 | Controlled Example 1 | Controlled Example 2 | Controlled Example 3 | Controlled Example 4 |
| 1 | 80 | 77 | 55 | 73 | 69 | 65 |
| 2 | 79 | 76 | 45 | 67 | 63 | 59 |
| 4 | 76 | 73 | 28 | 61 | 53 | 47 |
| 6 | 74 | 70 | 22 | 59 | 47 | 40 |
| 8 | 74 | 70 | 19 | 58 | 43 | 35 |
| 10 | 74 | 70 | 16 | 58 | 39 | 33 |

As is apparent from the results shown in Table 1, it is understood that since in Controlled Example 1, the specific surface of the catalyst is small at 45 m$^2$/g, it is impossible to obtain a desired ozone decomposing capability. Also, in Controlled Example 2, since the carrier is an extrusion article made of cordierite, even in accordance with the same process as in the present invention, the manganese dioxide-carrying amount is small at 37 g/m$^2$. As a result, it is impossible to ensure a desired ozone decomposing capability. With respect to Controlled Example 3, in accordance with a so-called solution method disclosed in Japanese Patent Application Laid-Open No. 245880/1989 which shows specifically ozone-decomposing catalyst of manganese dioxide, since the specific surface of the manganese power is small, it is impossible to obtain a desired ozone decomposing capability. Finally, with respect to Controlled Example 4, this example does not meet the temperature condition in the heat treatment. Namely, according to the present invention, the manganese dioxide powder may be adjusted in specific surface by the heat treatment as described in Reference Example 2, in addition to the process in accordance with Reference Example 1. In the case where the heat treatment (baking process) is effected, the suitable temperature condition must be met. In the excessive heat treatment (650° C. for three hours), the specific surface is small 60 m$^2$/g. It is impossible to obtain a satisfactory ozone decomposing capability.

As can be seen from the above, in accordance with the present invention, it is possible to provide a high-performance ozone filter which is more active, has a longer life, and a lower pressure loss than a conventional ozone filter.

What is claimed is:

1. An ozone filter for eliminating ozone produced in air, the filter comprising active fine powder manganese dioxide adhered to a carrier composed of paper, wherein:

said active manganese dioxide has a particle size of not more than 150 µm;

said carrier is composed of paper made of inorganic fibers; and said active manganese dioxide is fixed in said carrier in an amount not less than 40 g/m$^2$.

2. The ozone filter as claimed in claim 1, wherein said active manganese dioxide has a particle size of 0.3 to 50 µm, and a specific surface area of not less than 100 m$^2$/g.

3. The ozone filter as claimed in claim 2, wherein said active manganese dioxide has a specific surface area of not less than 150 m$^2$/g.

4. The ozone filter as claimed in claim 3, wherein said carrier has a porosity of 70 to 95% and a residual porosity of 50 to 85%.

5. A method for producing an ozone filter for eliminating ozone produced in air, comprising the following steps:

(a) dispersing activated manganese dioxide in water, together with a binder, to produce a resultant solution;

(b) impregnating a carrier composed of paper comprising inorganic fibers with said resultant solution, wherein not less than 40 g/m$^2$ of said activated fine manganese dioxide powder adheres to said carrier; and drying said carrier.

6. The method as claimed in claim 5, wherein said impregnating step comprises one of immersion and coating with an inorganic binder selected from the group consisting of silica sol, and titania sol.

* * * * *